(12) United States Patent
Kataya et al.

(10) Patent No.: US 10,860,158 B2
(45) Date of Patent: Dec. 8, 2020

(54) TOUCH PANEL DEVICE, TOUCH PANEL DEVICE CONTROL METHOD, AND NON-TRANSITORY TANGIBLE COMPUTER-READABLE STORAGE MEDIUM HAVING THE PROGRAM STORED THEREIN

(71) Applicant: FANUC CORPORATION, Yamanashi (JP)

(72) Inventors: Hiroyuki Kataya, Yamanashi-ken (JP); Yasumichi Sakoda, Yamanashi-ken (JP); Kouji Hada, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/706,925

(22) Filed: Dec. 9, 2019

(65) Prior Publication Data
US 2020/0192526 A1    Jun. 18, 2020

(30) Foreign Application Priority Data

Dec. 14, 2018  (JP) ................. 2018-234312

(51) Int. Cl.
*G06F 3/041*    (2006.01)
*G06F 3/044*    (2006.01)

(52) U.S. Cl.
CPC ........ *G06F 3/0446* (2019.05); *G06F 3/04182* (2019.05); *G06F 3/04186* (2019.05)

(58) Field of Classification Search
CPC ................. G06F 3/044; G06F 3/041; G06F 2203/04103; G06F 1/16
See application file for complete search history.

(56) References Cited

U.S. PATENT DOCUMENTS

| | | | |
|---|---|---|---|
| 2013/0027333 A1* | 1/2013 | Nagata | G06F 3/0418 345/173 |
| 2016/0179273 A1* | 6/2016 | Lee | G09G 5/00 345/174 |
| 2017/0024052 A1* | 1/2017 | Jota Costa | G06F 3/044 |
| 2018/0081454 A1* | 3/2018 | Nakabayashi | G06F 3/03545 |

FOREIGN PATENT DOCUMENTS

JP    2018106395 A    7/2018

* cited by examiner

*Primary Examiner* — Pegeman Karimi
(74) *Attorney, Agent, or Firm* — Robert P. Michal, Esq.; Carter, DeLuca & Farrell LLP

(57) ABSTRACT

A touch panel device having a touch panel includes: a driving unit for sending drive pulse signals to the touch panel; a receiving unit for receiving sense signals based on an operated position on the touch panel; a driving control unit for controlling the driving unit to send the drive pulse signal; a signal strength obtaining unit for obtaining strengths of the sense signals received by the receiving unit; and an operated position obtaining unit for obtaining the operated position based on sense signals, of the sense signals, in which an average of the strengths of the sense signals corresponding to the respective pulses of the drive pulse signal is equal to or greater than a given average and a variance of the strengths of the sense signals corresponding to the respective pulses of the drive pulse signal is less than a given variance.

3 Claims, 7 Drawing Sheets

FIG. 7A

| CORRESPONDING PULSE | P1 | P2 | P3 | P4 | AVERAGE | |
|---|---|---|---|---|---|---|
| SIGNAL STRENGTH DUE TO TOUCH | 1000 | 1000 | 1000 | 1000 | 1000 | → DETERMINED TO BE DUE TO TOUCH |
| SIGNAL STRENGTH DUE TO NOISE | 0 | 0 | 800 | 600 | 350 | → DETERMINED TO BE DUE TO NOISE |

FIG. 7B

| CORRESPONDING PULSE | P1 | P2 | P3 | P4 | AVERAGE | |
|---|---|---|---|---|---|---|
| SIGNAL STRENGTH DUE TO TOUCH | 1000 | 1000 | 1000 | 1000 | 1000 | → DETERMINED TO BE DUE TO TOUCH |
| SIGNAL STRENGTH DUE TO NOISE | 0 | 0 | 3000 | 1500 | 1125 | → ERRONEOUSLY DETERMINED TO BE DUE TO TOUCH |

FIG. 7C

| CORRESPONDING PULSE | P1 | P2 | P3 | P4 | AVERAGE | VARIANCE | |
|---|---|---|---|---|---|---|---|
| SIGNAL STRENGTH DUE TO TOUCH | 1000 | 1000 | 1000 | 1000 | 1000 | 0 | ← DETERMINED TO BE DUE TO TOUCH |
| SIGNAL STRENGTH DUE TO NOISE | 0 | 0 | 3000 | 1500 | 1125 | 1546875 | → DETERMINED TO BE DUE TO NOISE |

TOUCH PANEL DEVICE, TOUCH PANEL DEVICE CONTROL METHOD, AND NON-TRANSITORY TANGIBLE COMPUTER-READABLE STORAGE MEDIUM HAVING THE PROGRAM STORED THEREIN

CROSS-REFERENCE TO RELATED APPLICATION

This application is based upon and claims the benefit of priority from Japanese Patent Application No. 2018-234312 filed on Dec. 14, 2018, the contents of which are incorporated herein by reference.

BACKGROUND OF THE INVENTION

Field of the Invention

The present invention relates to a touch panel device having a capacitive touch panel, a touch panel device control method, and a non-transitory tangible computer-readable storage medium having stored therein a program for causing a computer to execute the touch panel device control method.

Description of the Related Art

Conventionally, techniques have been disclosed in which the touched position on a touch panel is detected by sensing change in capacitance based on change in capacitive coupling between the finger and electrodes at the touched position (e.g., Japanese Laid-Open Patent Publication No. 2018-106395).

SUMMARY OF THE INVENTION

However, the technique above may incorrectly detect the touched position since it also senses change in capacitance caused by noise.

The present invention has been made in order to solve the problem above, and an object of the present invention is to provide a touch panel device having high noise immunity, a control method for controlling the touch panel device, and a non-transitory tangible computer-readable storage medium having stored therein a program for causing a computer to execute the touch panel device control method.

According to a first aspect of the present invention, a touch panel device including a capacitive touch panel includes: a driving unit configured to send a drive pulse signal to the touch panel; a receiving unit configured to receive sense signals based on an operated position on the touch panel, the sense signals being outputted from the touch panel; a driving control unit configured to control the driving unit so that the driving unit sends a given number of pulses of the drive pulse signals at a given frequency; a signal strength obtaining unit configured to obtain strengths of the sense signals received by the receiving unit; and an operated position obtaining unit configured to obtain the operated position based on sense signals, among the sense signals, in which an average of the strengths of the sense signals corresponding to the respective pulses of the drive pulse signal is equal to or greater than a given average and a variance of the strengths of the sense signals corresponding to the respective pulses of the drive pulse signal is less than a given variance.

According to a second aspect of the present invention, there is provided a method of controlling a touch panel device including a capacitive touch panel. The touch panel device includes a driving unit configured to send a drive pulse signal to the touch panel, and a receiving unit configured to receive sense signals based on an operated position on the touch panel, the sense signals being outputted from the touch panel. The touch panel device control method includes: a driving control step of controlling the driving unit so that the driving unit sends a given number of pulses of the drive pulse signal at a given frequency; a signal strength obtaining step of obtaining strengths of the sense signals received by the receiving unit; and an operated position obtaining step of obtaining the operated position based on sense signals, among the sense signals, in which an average of the strengths of the sense signals corresponding to the respective pulses of the drive pulse signal is equal to or greater than a given average and a variance of the strengths of the sense signals corresponding to the respective pulses of the drive pulse signal is less than a given variance.

A third aspect of the present invention is directed to a non-transitory tangible computer-readable storage medium having stored therein a program that causes a computer to execute the touch panel device control method according to the second aspect.

It is possible to improve noise immunity of the touch panel device.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIGS. 7A, 7B and 7C are tables showing examples of the strengths of sense signals corresponding to respective pulses.

DESCRIPTION OF THE PREFERRED EMBODIMENTS

First Embodiment

[Configuration of Touch Panel Device]

Figure 1:
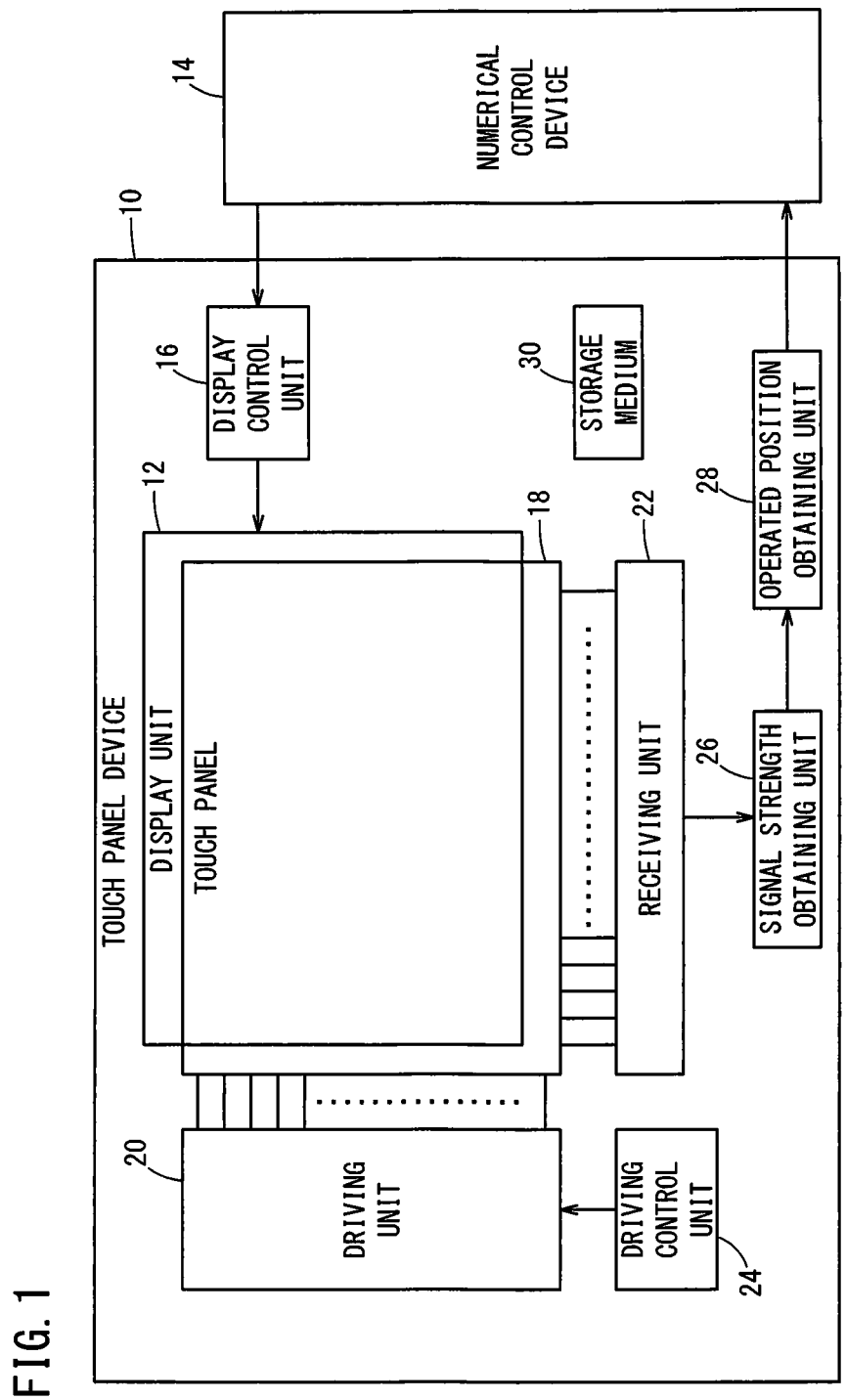
FIG. 1 is a block diagram showing the configuration of a touch panel device.

FIG. 1 is a block diagram showing the configuration of a touch panel device 10. The touch panel device 10 is an input device that allows a user to perform an operation by touching a screen of a display unit 12 where images etc. are displayed, by using an operating member such as a finger, stylus, etc. The touch panel device 10 of this embodiment is used as an input device for a numerical control device 14 for controlling a machine tool not shown.

The touch panel device 10 includes the display unit 12, a display control unit 16, a touch panel 18, a driving unit 20, a receiving unit 22, a driving control unit 24, a signal strength obtaining unit 26, and an operated position obtaining unit 28.

The display unit 12 can be a liquid-crystal display, for example, which displays icons through which a user can enter commands into the numerical control device 14, information indicating conditions of the machine tool sent from the numerical control device 14, and so on. The display control unit 16 controls the display unit 12 according to requests from the numerical control device 14.

The touch panel 18 is a transparent film-shaped member put or stuck on the screen of the display unit 12. The touch panel 18 of this embodiment is a capacitive touch panel. In the description below, an example in which the capacitive touch panel is a mutual capacitance touch panel will be described, but the touch panel 18 may be a self-capacitance touch panel. The driving unit 20 and the receiving unit 22 are connected to the touch panel 18.

Figure 2:
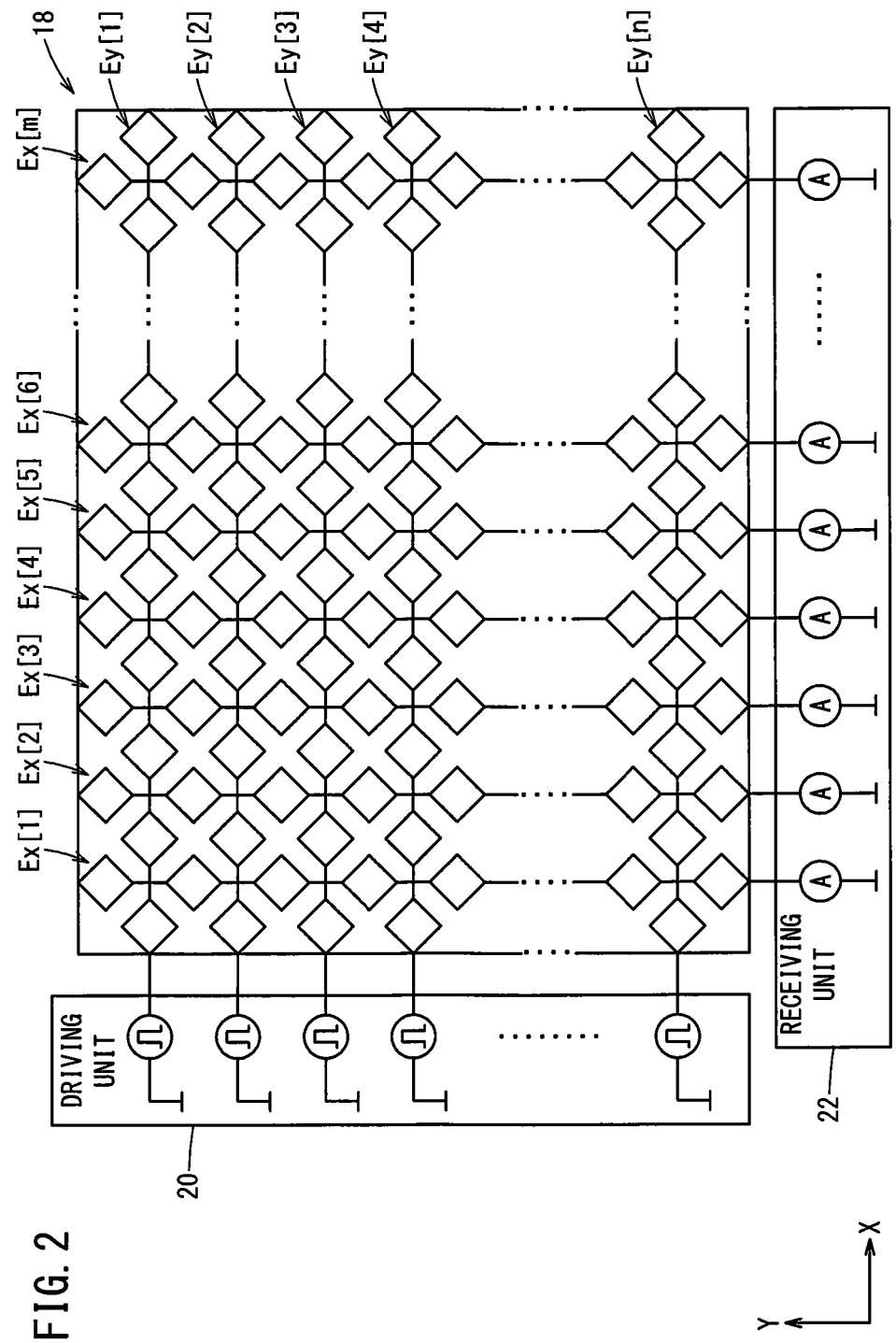
FIG. 2 is a schematic diagram showing a structure of the touch panel.

FIG. 2 is a schematic diagram showing a structure of the touch panel 18. The touch panel 18 includes X-axis electrodes Ex[1] to Ex[m] and Y-axis electrodes Ey[1] to Ey[n] made of indium tin oxide. The X-axis electrodes Ex[1] to Ex[m] each extend in the Y-axis direction in FIG. 2, and the electrodes Ex[1] to Ex[m] are arranged in the X-axis direction to form m-lines of electrodes. The Y-axis electrodes Ey[1] to Ey[n] each extend in the X-axis direction in FIG. 2, and the electrodes Ey[1] to Ey[n] are arranged in the Y-axis direction to form n-lines of electrodes.

The driving unit 20 is connected to the Y-axis electrodes Ey[1] to Ey[n]. The driving unit 20 sends drive pulse signals respectively to the Y-axis electrodes Ey[1] to Ey[n]. Hereinafter, the Y-axis electrodes Ey[1] to Ey[n] may be collectively referred to as Y-axis electrodes Ey when it is not necessary to distinguish the lines thereof from each other.

The receiving unit 22 is connected to the X-axis electrodes Ex[1] to Ex[m]. The receiving unit 22 receives current signals respectively from the X-axis electrodes Ex[1] to Ex[m]. Hereinafter, the X-axis electrodes Ex[1] to Ex[m] may be collectively referred to as X-axis electrodes Ex when it is not necessary to distinguish the lines thereof from each other.

Figure 3:
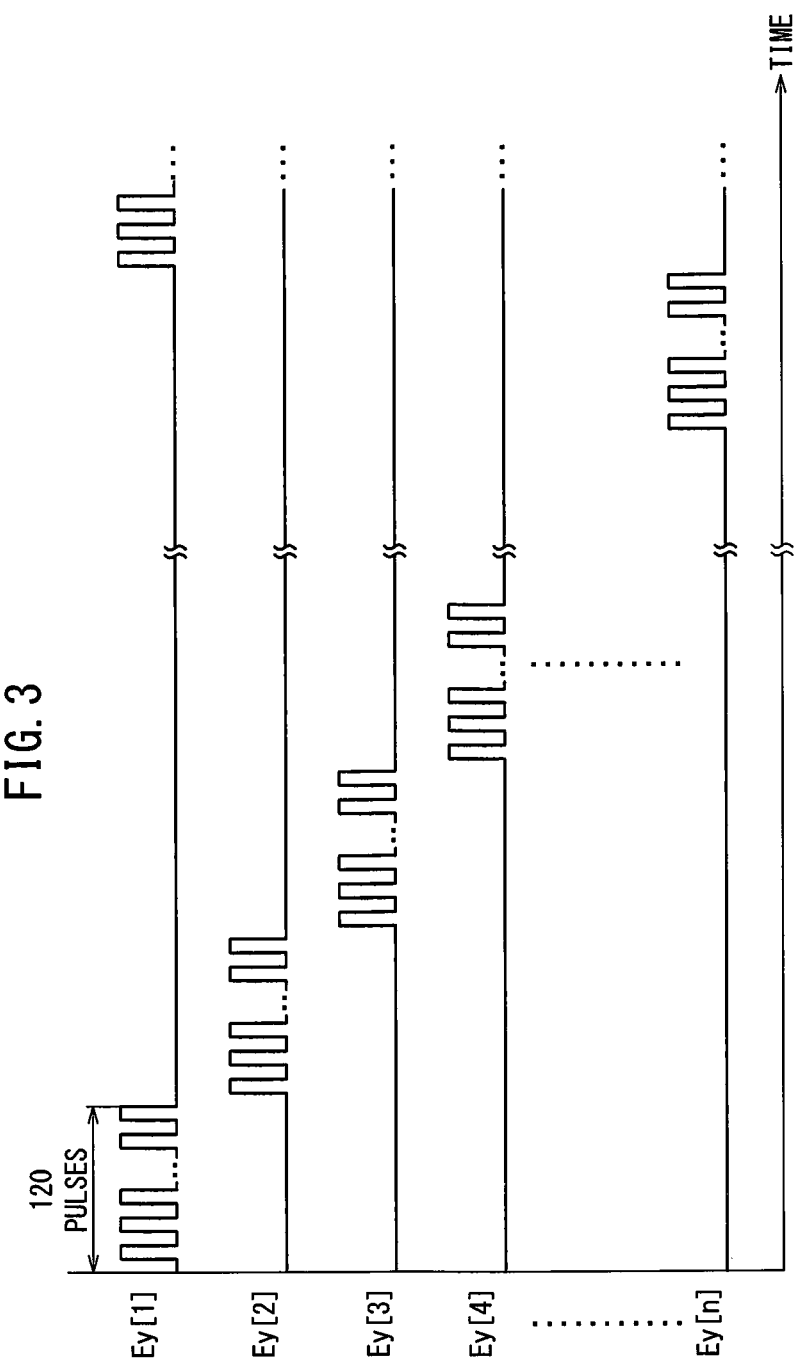
FIG. 3 is a graph showing drive pulse signals that are inputted respectively to Y-axis electrodes from a driving unit.

Returning to FIG. 1, the driving control unit 24 controls the driving unit 20 to send the drive pulse signals at a set frequency sequentially to the Y-axis electrode Ey[1] to Y-axis electrode Ey[n]. FIG. 3 is a graph illustrating the drive pulse signals inputted from the driving unit 20 respectively to the Y-axis electrodes Ey. The driving control unit 24 controls the driving unit 20 so that the driving unit 20 sends 120 pulses of the drive pulse signal at the predetermined set frequency sequentially to the Y-axis electrodes Ey. The driving unit 20 periodically sends the drive pulse signals respectively to the Y-axis electrodes Ey[1] to Ey[n], and more specifically sends 120 pulses at a time. The number of pulses of the drive pulse signal is not limited to 120 pulses.

From the current signals received at the receiving unit 22 respectively from the X-axis electrodes Ex, the signal strength obtaining unit 26 obtains the strengths of the sense signals at nodes N[1, 1] to N[m, n] on the touch panel 18. The nodes N[1, 1] to N[m, n] may hereinafter be collectively referred to as nodes N when it is not necessary to distinguish them.

When the operating member is not in contact with the touch panel 18, i.e., when the touch panel 18 is not being operated, electric current flows between the Y-axis electrodes Ey and X-axis electrodes Ex in accordance with the drive pulse signals. At this time, the amplitude of the voltage signal obtained by converting the current signal of an X-axis electrode Ex received by the receiving unit 22 is voltage V0. When the operating member is in contact with the touch panel 18, i.e., when the touch panel 18 is being operated, current flows also between the Y-axis electrodes Ey and the operating member in accordance with the drive pulse signals. Accordingly, the current flowing to the X-axis electrodes Ex when the touch panel 18 is being operated is smaller than when the touch panel 18 is not being operated. At this time, the voltage signal obtained by converting the current signal of the X-axis electrode Ex received by the receiving unit 22 has an amplitude smaller than the voltage V0. Using the voltage V0 as a reference voltage, the signal strength obtaining unit 26 obtains, as the strength of the sense signal at each X-axis electrode Ex, a value corresponding to the difference |V0−V| between the voltage V0 and the voltage V obtained by converting the current of each Y-axis electrode Ey received by the receiving unit 22.

Figure 4:
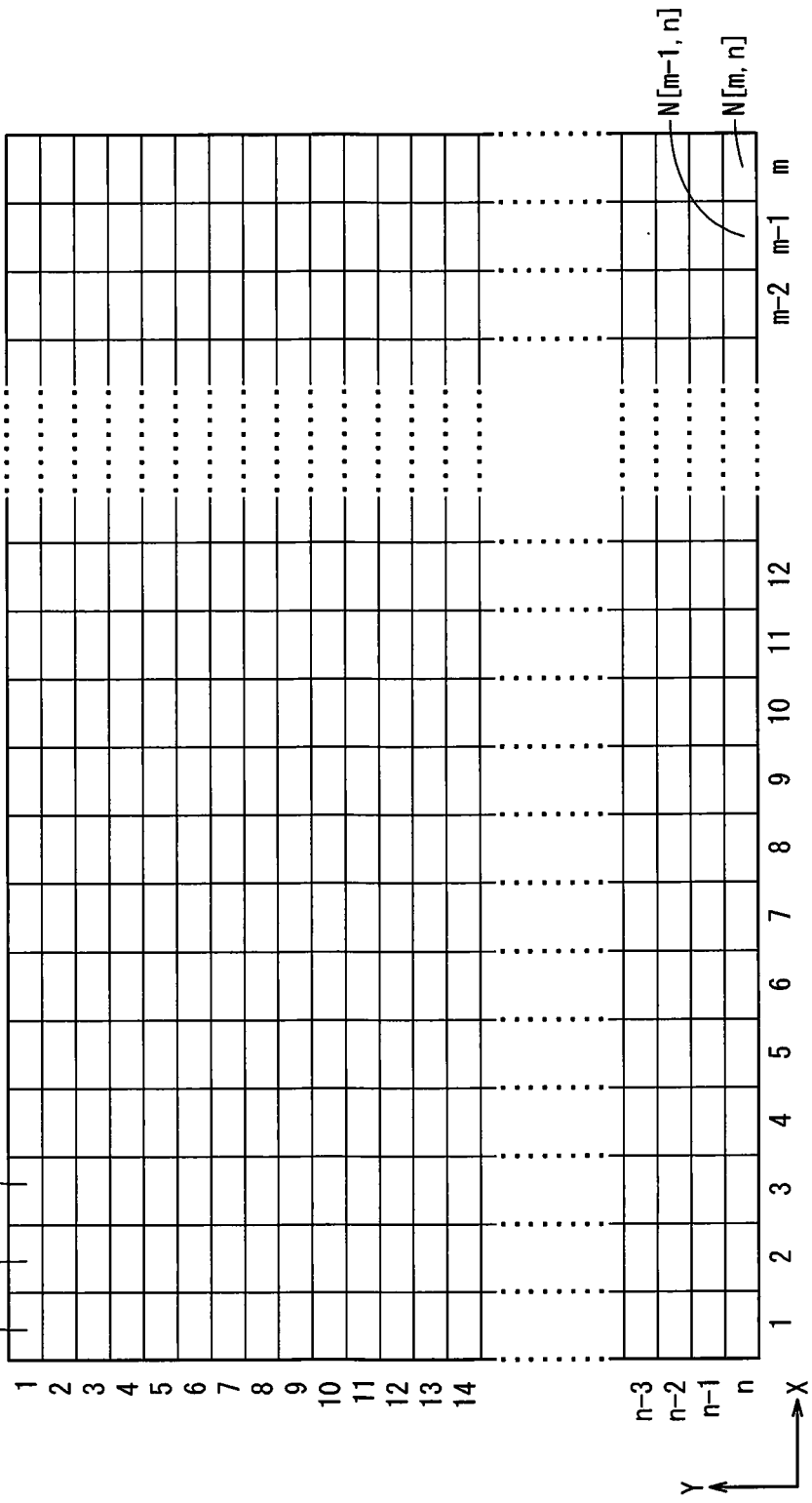
FIG. 4 is a diagram illustrating nodes on the touch panel.

FIG. 4 is a diagram illustrating the nodes N[1, 1] to N[m, n] on the touch panel 18. Each node N corresponds to one of the sections defined by dividing the top surface of the touch panel 18 into a matrix of sections. Each node N is associated with a set of a Y-axis electrode Ey and an X-axis electrode Ex. FIG. 4 shows lines indicating the partition lines between the nodes N, but the lines indicating the partition lines between the nodes N are not visible in an actual touch panel 18.

The signal strength obtaining unit 26 specifies one node N that corresponds to a combination of a line of Y-axis electrode Ey to which the driving unit 20 has sent the drive pulse signal and a line of X-axis electrode Ex from which the receiving unit 22 has received the current signal. Then, the signal strength obtaining unit 26 obtains the strength of the sense signal at the X-axis electrode Ex as the strength of the sense signal at the specified node N. For example, if the driving unit 20 has sent the drive pulse signal to the Y-axis electrode Ey[3] and the receiving unit 22 has received the current signal from the X-axis electrode Ex[4], then the signal strength obtaining unit 26 specifies the node N[4, 3]. Then, the signal strength obtaining unit 26 obtains the strength of the sense signal of the X-axis electrode Ex[4] as the strength of the sense signal at the node N[4, 3].

The operated position obtaining unit 28 obtains the operated position touched by the operating member in accordance with the strength of the sense signal at each node N obtained by the signal strength obtaining unit 26. The process by which the operated position obtaining unit 28 obtains the operated position will be described in detail later.

The display control unit 16, the driving control unit 24, the signal strength obtaining unit 26, and the operated position obtaining unit 28 are realized by a computer executing a program stored in a storage medium 30. The storage medium 30 is a non-transitory tangible computer-readable storage medium.

[Operated Position Obtaining Processing]

Figure 5:
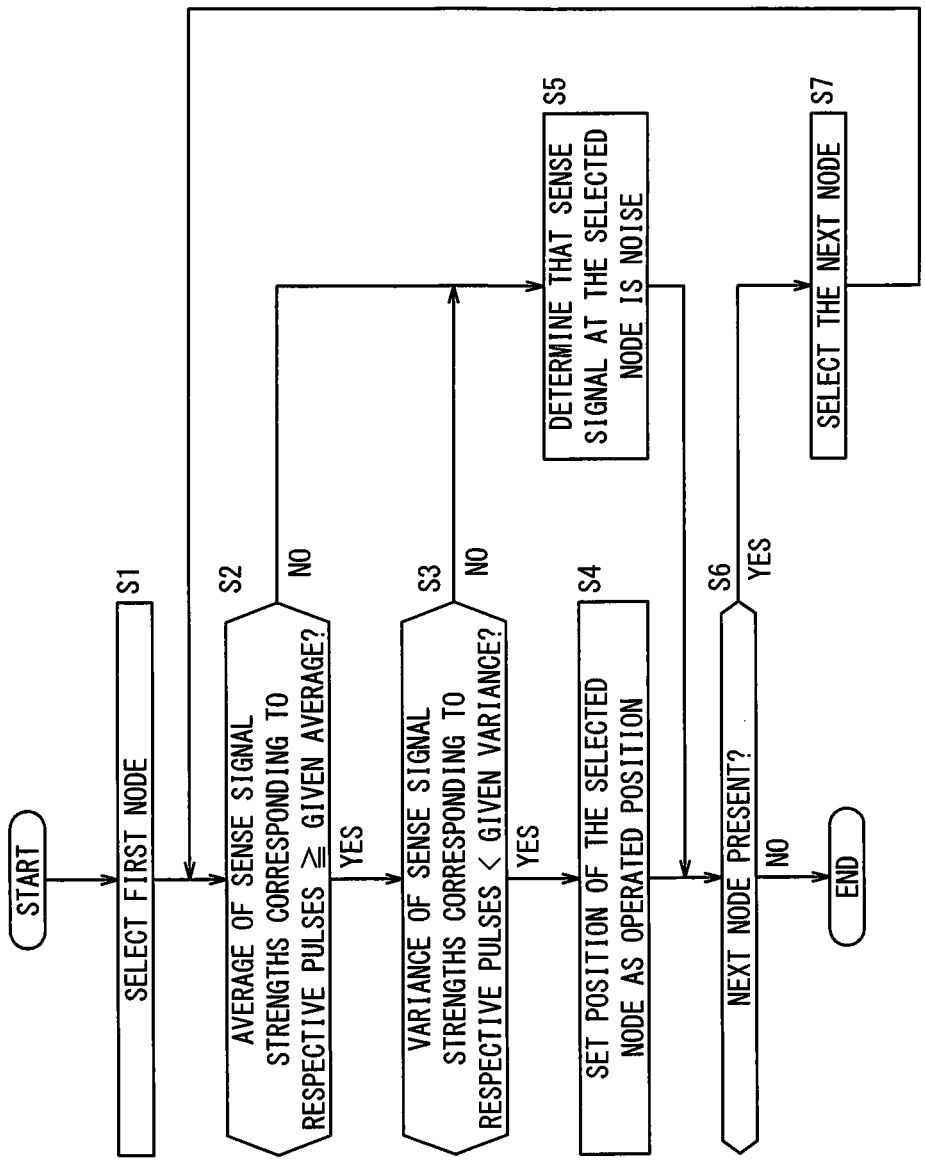
FIG. 5 is a flowchart showing the flow of an operated position obtaining process performed by an operated position obtaining unit.

FIG. 5 is a flowchart showing the flow of an operated position obtaining process performed by the operated position obtaining unit 28.

At step S1, the operated position obtaining unit 28 selects a first node N. The nodes N are selected in the order of node N[1, 1]→node N[2, 1]→node N[3, 1]→ . . . →node N[m−1, n]→node N[m, n], for example.

At step S2, the operated position obtaining unit 28 determines whether or not the average of the strengths of the sense signals corresponding to the respective pulses of the drive pulse signal at the selected node N is equal to or greater than a given average (i.e., whether the average of the sense signal strengths≥the given average). If the average of the strengths of the sense signals is equal to or greater than the given average, the process moves to step S3; if the average of the strengths of the sense signals is less than the given average, the process moves to step S5.

At step S3, the operated position obtaining unit 28 determines whether a variance of the strengths of the sense signals corresponding to the respective pulses of the drive pulse signal at the selected node N is less than a given variance (i.e., whether the variance of the sense signal strengths<the given variance). If the variance of the strengths of the sense signals is less than the given variance, the process moves to step S4; if the variance of the strengths of the sense signals is equal to or greater than the given variance, the process moves to step S5.

At step S4, the operated position obtaining unit 28 sets the position of the selected node N as the operated position.

At step S5, the operated position obtaining unit 28 determines that the sense signal at the selected node N is noise.

At step S6, the operated position obtaining unit 28 determines whether there is a next node N. If there is a next node N, the process moves to step S7; if there is no next node N, the operated position obtaining process terminates.

At step S7, the operated position obtaining unit 28 selects the next node N and returns to step S2.

[Functions and Effects]

Capacitive touch panels like the touch panel 18 of the embodiment might detect a position not being operated (touched) by the operating member, as an operated position (touched position) because of electric noise. As such, methods for determining whether the sense signal is due to noise or not have been proposed.

Figure 6:
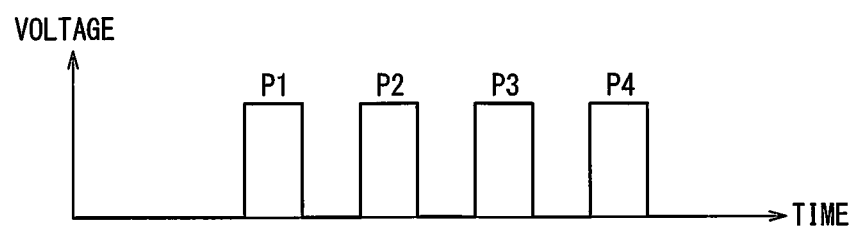
FIG. 6 is a graph illustrating the drive pulse signals inputted from the driving unit to the Y-axis electrodes.

FIG. 6 is a graph illustrating the drive pulse signal inputted from the driving unit 20 to each Y-axis electrode Ey. While, in this embodiment, 120 pulses of drive pulse signal are sent to each Y-axis electrode Ey at a time, the explanation below will be given assuming that 4 pulses of drive pulse signal are sent to each Y-axis electrode Ey at a time, in order to simplify the explanation. In addition, as shown in FIG. 6, the pulses of the drive pulse signal are designated by symbols P1 to P4 for the sake of explanation. The signal strength obtaining unit 26 obtains the strengths of the sense signals that correspond to the respective pulses P1 to P4.

FIGS. 7A, 7B and 7C are tables that show examples of the strengths of the sense signals corresponding respectively to the pulses P1 to P4. Usually, the strength of sense signal due to noise is smaller than the strength of sense signal due to touch (operation). Further, the duration of noise is extremely short and therefore the strength of sense signal due to noise is detected a smaller number of times during the period of sending the drive pulse signal at a time. On the other hand, the period of time during which a touch operation is performed with the operating member is longer than the duration of noise and therefore the strength of sense signal due to touch is detected a larger number of times during the period of sending the drive pulse signal at a time. Hence, as shown in FIG. 7A, it is possible to determine that the sense signal is due to noise if the average of the strengths of the sense signals corresponding to the respective pulses is less than a given average (e.g., given average=500).

However, as shown in FIG. 7B, if extremely intensive noise occurs, the average of the strengths of the sense signals due to the noise may be equal to or larger than the given average, so that it is impossible to determine whether the sense signal is due to noise.

Accordingly, in the touch panel device 10 of this embodiment, the operated position obtaining unit 28 determines that the sense signal is a sense signal due to noise not only when the average of the strengths of the sense signals corresponding to the respective pulses is less than a given average but also when the variance of the strengths of the sense signals corresponding to the respective pulses is equal to or greater than a given variance (e.g., given variance=250000). The duration of noise is extremely short and the sense signal strengths corresponding to the respective pulses vary greatly, so that it is possible to accurately determine whether the sense signal is due to noise or not by using the variance of the strengths of the sense signals (FIG. 7C).

Further, in the touch panel device 10 of this embodiment, the operated position obtaining unit 28 obtains the operated position (touched position) on the basis of sense signals, of the sense signals, in which the average of the strengths of the sense signals corresponding to the respective pulses is equal to or greater than a given average and the variance of the strengths of the sense signals corresponding to the respective pulses is less than a given variance. This improves noise immunity of the touch panel device 10 (FIG. 7C).

Technical Ideas Obtained from Embodiments

The touch panel device (10) including a capacitive touch panel (18) includes: a driving unit (20) configured to send a drive pulse signal to the touch panel; a receiving unit (22) configured to receive sense signals based on an operated position on the touch panel, the sense signals being outputted from the touch panel; a driving control unit (24) configured to control the driving unit such that the driving unit sends a given number of pulses of the drive pulse signal at a given frequency; a signal strength obtaining unit (26) configured to obtain strengths of the sense signals received by the receiving unit; and an operated position obtaining unit (28) configured to obtain the operated position based on sense signals, among the sense signals, in which the average of the strengths of the sense signals corresponding to the respective pulses of the drive pulse signal is equal to or greater than a given average and a variance of the strengths of the sense signals corresponding to the respective pulses of the drive pulse signal is less than a given variance. It is thus possible to improve noise immunity of the touch panel device.

In a method of controlling a touch panel device (10) including a capacitive touch panel (18), the touch panel device includes a driving unit (20) configured to send a drive pulse signal to the touch panel, and a receiving unit (22) configured to receive sense signals based on an operated position on the touch panel, the sense signals being outputted from the touch panel. The touch panel device control method includes: a driving control step of controlling the driving unit such that the driving unit sends a given number of pulses of the drive pulse signals at a given frequency; a signal strength obtaining step of obtaining strengths of the sense signals received by the receiving unit; and an operated position obtaining step of obtaining the operated position based on sense signals, among the sense signals, in which the average of the strengths of the sense signals corresponding to the respective pulses of the drive pulse signal is equal to or greater than a given average and a variance of the strengths of the sense signals corresponding to the respective pulses of the drive pulse signal is less than a given variance. It is thus possible to improve noise immunity of the touch panel device.

Further, there is provided a program that causes a computer to execute the touch panel device (10) control method described above. It is thus possible to improve noise immunity of the touch panel device.

Yet further, there is provided a non-transitory tangible computer-readable storage medium (30) having stored therein a program that causes a computer to execute the touch panel device (10) control method described above. It is thus possible to improve noise immunity of the touch panel device.

The present invention is not particularly limited to the embodiment described above, and various modifications are possible without departing from the essence and gist of the present invention.

What is claimed is:

1. A touch panel device including a capacitive touch panel, comprising:
   a computer having instructions stored therein, that when executed cause the touch panel device to:
   send a drive pulse signal to the touch panel;
   receive sense signals based on an operated position on the touch panel, the sense signals being outputted from the touch panel;
   send a given number of pulses of the drive pulse signal at a given frequency to electrodes;
   obtain strengths of the received sense signals; and
   obtain the operated position based on sense signals, among the sense signals, in which an average of the strengths of the sense signals corresponding to the respective pulses of the drive pulse signal having been sent to the electrodes is equal to or greater than a given average, and a variance of the strengths of the sense signals corresponding to the respective pulses of the drive pulse signal having been sent to the electrodes is less than a given variance.

2. A method of controlling a touch panel device including a capacitive touch panel, comprising:
   sending a given number of pulses of a drive pulse signal at a given frequency to electrodes;
   receiving sense signals based on an operated position on the touch panel, the sense signals being outputted from the touch panel;
   obtaining strengths of the received sense signals; and
   obtaining the operated position based on sense signals, among the sense signals, in which an average of the strengths of the sense signals corresponding to the respective pulses of the drive pulse signal having been sent to the electrodes is equal to or greater than a given average, and a variance of the strengths of the sense signals corresponding to the respective pulses of the drive pulse signal having been sent to the electrodes is less than a given variance.

3. A non-transitory tangible computer-readable storage medium having stored therein a program that causes a computer to execute the touch panel device control method according to claim 2.

* * * * *